Sept. 24, 1963  P. C. THONEMANN ET AL  3,105,031
GAS DISCHARGE APPARATUS
Filed July 1, 1959  7 Sheets-Sheet 1

INVENTORS
PETER CLIVE THONEMANN
ANTHONY EMERSON ROBSON
ROGER NORMAN HALL
BY Larson and Taylor Sept. 24, 1963 P. C. THONEMANN ETAL 3,105,031
GAS DISCHARGE APPARATUS
Filed July 1, 1959 7 Sheets-Sheet 6

INVENTORS
PETER CLIVE THONEMANN
ANTHONY EMERSON ROBSON
ROGER NORMAN HALL

BY Lawson and Taylor

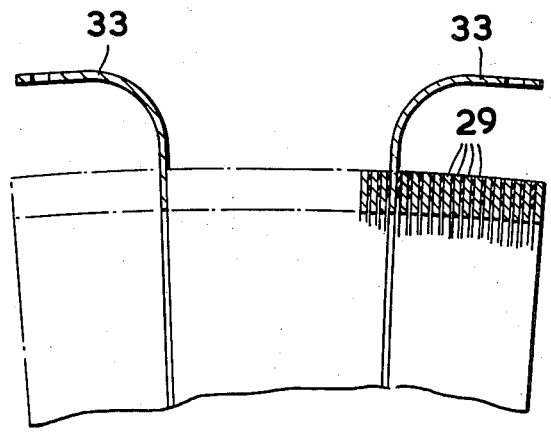
FIG. 8.
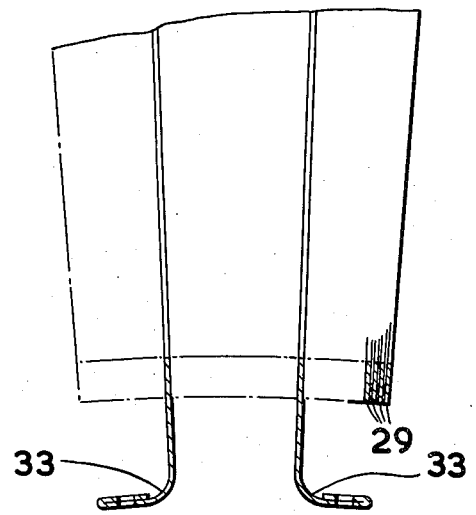

United States Patent Office    3,105,031
Patented Sept. 24, 1963

3,105,031
GAS DISCHARGE APPARATUS
Peter Clive Thonemann, Cumnor, near Oxford, Anthony Emerson Robson, Oxford, and Roger Norman Hall, Abingdon, England, assignors to United Kingdom Atomic Energy Authority, London, England
Filed July 1, 1959, Ser. No. 824,371
13 Claims. (Cl. 204—193.2)

This invention relates to gas discharge apparatus and has one application in apparatus of the type described in the specification of copending application Serial No. 692,500, filed October 25, 1957, now Patent 3,054,742, dated September 18, 1962, in which a constricted ring discharge forming the single-turn secondary winding of a pulse transformer is set up in gas contained in a metal torus. Such apparatus is used for research into the production of controlled thermonuclear reactions.

In the specification of copending application Serial No. 743,272, filed June 20, 1958, and now abandoned, reference is made to the problem of arc spot formation on the inner surface of the metal liner system which shields the insulating gaps in the wall of the torus from bombardment by ions or photons from the discharge. In this specification it is explained how arc spots are liable to form if a metallic surface exposed to the discharge exceeds a certain critical area, and a solution is proposed in which such surfaces are formed of a plurality of mutually insulated plates each less than the critical area. The theory of the formation of these arc spots, known as unipolar arcs, is given in a paper by P. C. Thonemann and A. E. Robson in Proc. Phys. Soc., vol. 73, pt. 3, pp. 508–512, March 1959. It is one object of the present invention to provide a further form of subdivided liner surface.

According to the present invention in a gas discharge apparatus comprising a metallic surface exposed to the discharge, said surface is formed of a plurality of closely-spaced, mutually-insulated, thin metallic plates mounted substantially edge-on to the discharge, the edge dimensions and spacing of the plates being such that the effective area of each plate exposed to the discharge is less than that required to maintain a unipolar arc.

Said discharge may be a ring discharge, said surface being an inner toroidal surface arranged to envelop the discharge. Said plates may be arranged in planes substantially normal to the continuous axis of the discharge, and a plurality of said plates may be arranged round the small circumference of the torodial surface.

Said plates may consist of arcuate portions of a plurality of radially-slotted plate-like metallic rings bonded together by means including an insulant over an area extending part-way from the outer edge of each ring towards the inner edge. The rings may be spaced apart by the insulant and some at least of the metallic rings may be of tapered cross-section.

The portions of said plates nearest the discharge may be bent such that the insulation between adjacent plates is not directly exposed to the discharge.

A method of producing a surface according to the invention comprises the steps of forming said rings with the radial slots bridged by external lugs, bonding the rings together with the slots of adjacent rings staggered relative to one another, and removing the lugs.

A further method of producing a surface according to the invention comprises the steps of coating said rings with a first insulant to a thickness of approximately half the required spacing between the plates, and bonding the rings together with a second insulant having a lower melting point than the first insulant.

To enable the nature of the invention to be more readily understood, attention is directed by way of example to the accompanying drawings wherein:

FIG. 8 is a cross-section on the line VIII—VIII of FIG. 7.

Figure 1:
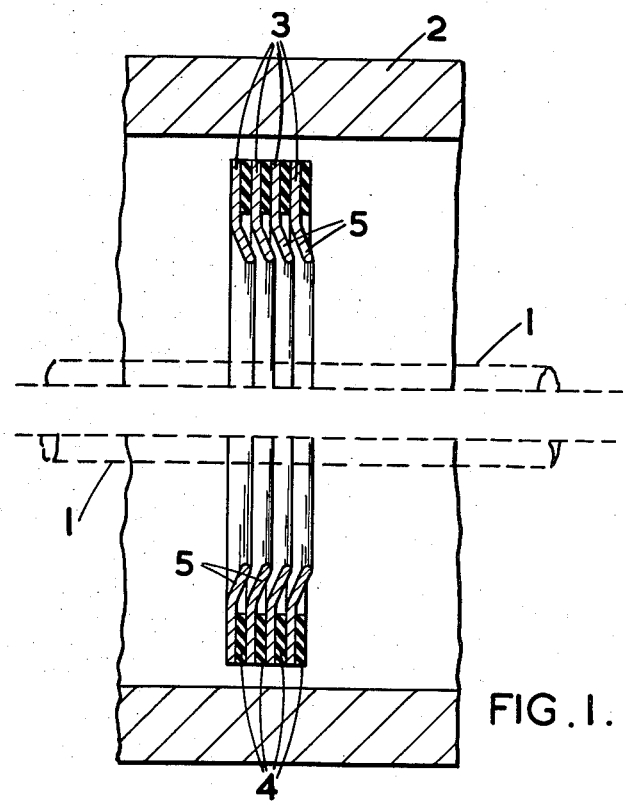
FIG. 1 is a longitudinal section through part of a torus and liner system illustrating the principle of the invention.

In FIG. 1 a constricted ring discharge 1 is shown set up in gas in a torus having a metal wall 2. The discharge is screened from the wall by a liner system comprising a plurality of flat metal rings 3 separated by annular insulating spacers 4. Only four rings and four spacers are shown, but it will be appreciated that the liner system forms a continuous liner within the torus. The rings and spacers may be bonded together by an adhesive in a manner similar to that used in the production of accelerating tubes for Van de Graaff generators. The inner edge of each ring may be bent slightly as shown at 5, to screen an adjacent spacer 4 from the discharge. The order of thickness of the rings and spacers is 1–2 mm.

The liner system shown in FIG. 1 has a number of advantages. Firstly the effective area of each ring exposed to the discharge is small (roughly an area extending from the inner edge for a distance equal to the spacer thickness), and hence the liability to form arc spots is reduced. Secondly the system has good thermal conductivity in the radial direction. Thirdly it has high electrical strength in the axial direction, since the induced voltage between adjacent rings is small. Fourthly, because of the good circular conduction path round each ring, the rings are effective in excluding the entry of the axial magnetic stabilising field into the liner system after the discharge has pinched. (A condition for stability of the pinched discharge is that the field within the discharge channel 1 should be substantially only axial and the field outside the channel only azimuthal for the duration of the pulse.) The windings which provide the axial field are not shown in the drawing; they may be wound on the outside of the liner system itself but are preferably wound on the outside of the torus 2.

Fifthly any arcs which do form are driven down the gaps between the rings by the prevailing magnetic field and are extinguished. It has been found experimentally that the arcs run down a distance approximately equal to the separation of the rings before extinguishing.

The advantage of bending the inner edges as shown at 5 is that the spacers do not "see" the discharge and hence the danger of chemical decomposition of the insulation by photons, and of the deposition thereon of metal vapour from arcs when the discharge expands at the end of the pulse is reduced.

Figure 2:
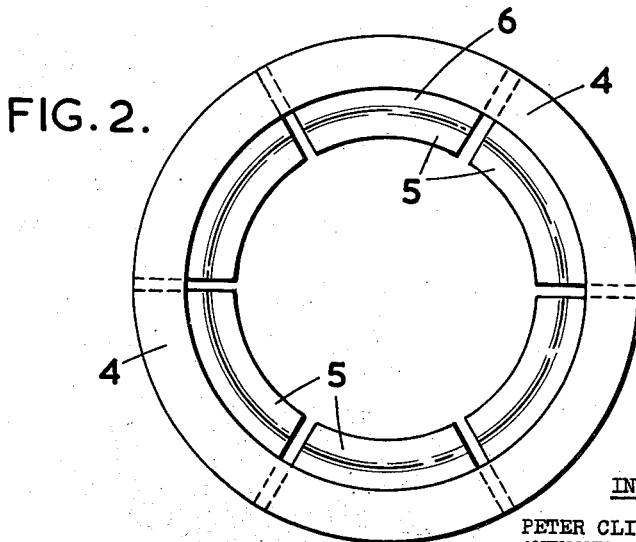
FIG. 2 is an end view of a modification of the liner system of FIG. 1.

To further reduce the area of each surface exposed to the discharge, each ring may be divided by radial slots into a number of segments or plates 6 as indicated in FIG. 2. In this case the fourth advantage mentioned above is reduced, but this feature may be restored by providing, for example, separate conducting metal rings round the outside of the liner.

As an alternative to making the spacers 4 of insulating material, they may take the form of flat metal rings, e.g. of copper, which are bonded to the rings, the latter being provided with an insulating coating, e.g. by enamelling or anodising their surfaces. These metal spacers also serve to exclude the axial field when the rings are segmented.

The liner system may be made gas-tight and serve as the containing vessel for the fuel gas, the function of the metal torus, which need not be gas-tight, being only to reduce long-wave instabilities of the discharge. The rings may be provided with cooling means, e.g. fins, in the space between liner and torus.

Figure 3:
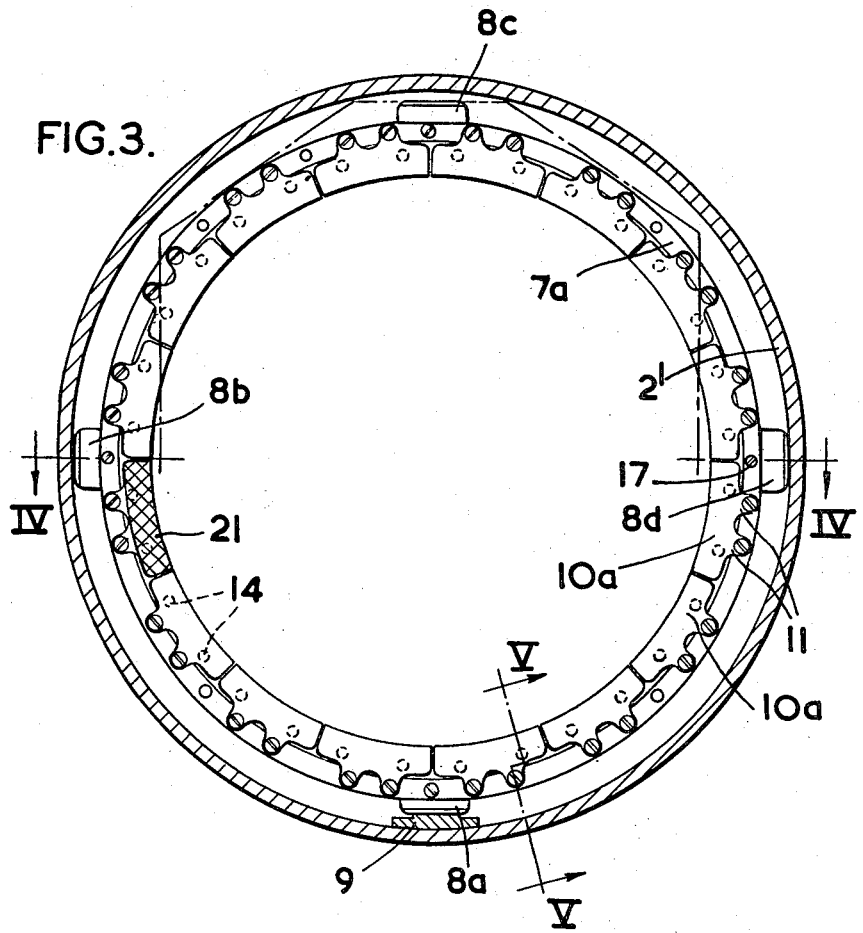
FIG. 3 is a cross-section of a torus showing an end view of one curved section of a liner embodying the invention.

FIGS. 3 to 6 show in detail an embodiment suitable for installation in an experimental gas discharge apparatus of the kind described in the specification of copending application Serial No. 692,500, filed October 25, 1957, in which the torus is separable into two halves at two diametrically spaced insulating joints. The liner is formed of a plurality of short sections bolted together, FIG. 3, showing an end-face of a typical section and FIG. 4 a cross-section of this section in the median plane of the torus, which is of 14 inch bore. The section shown is shaped to fit into a curved portion of the torus, but it will be appreciated that the complete liner comprises curved and straight sections as appropriate to match the shape of the torus. A total of forty curved sections is used in the present embodiment, divided into four ten-section quadrants by eight straight sections arranged in pairs.

Figure 4:
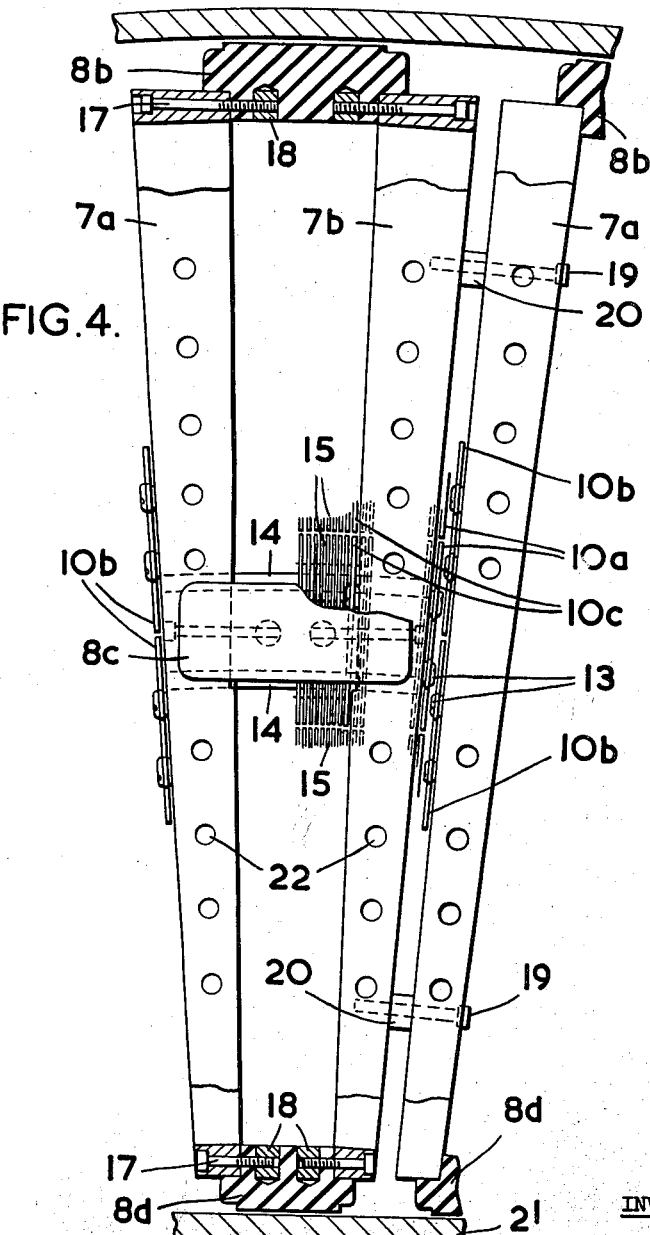
FIG. 4 is a cross-section on the line IV—IV of FIG. 3.
Figure 5:
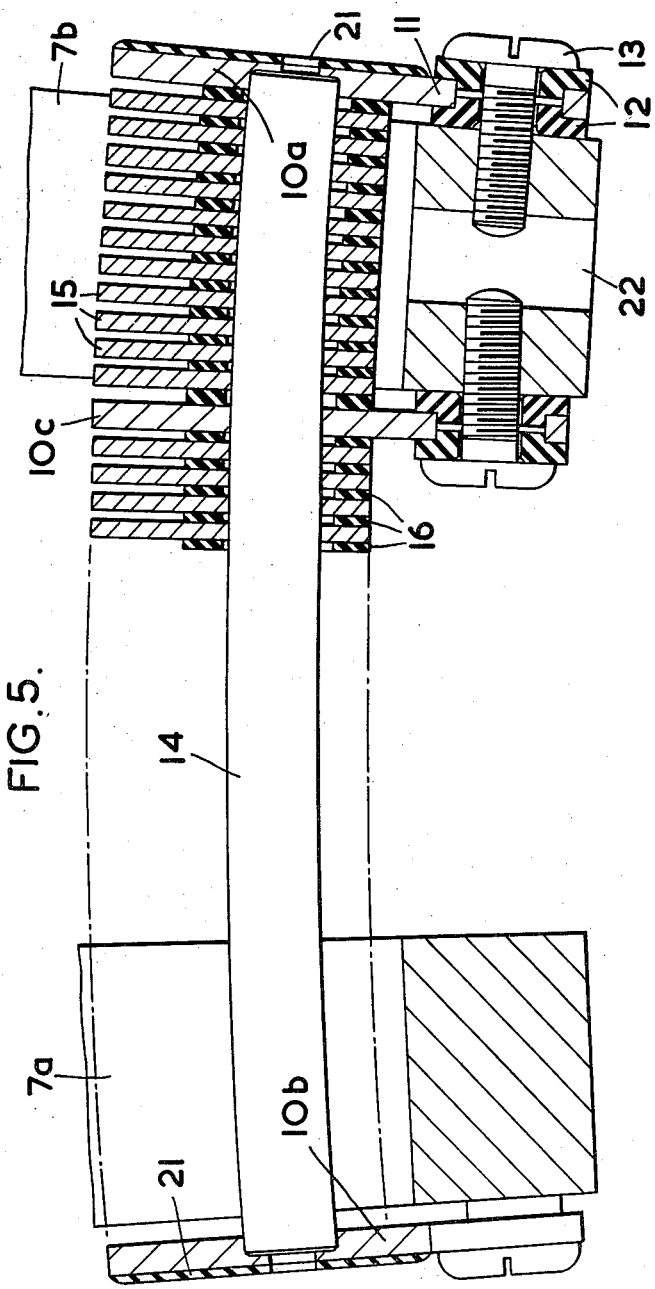
FIG. 5 is a section on the line V—V of FIG. 3 to an enlarged scale.

Referring to FIGS. 3–5, a section of liner comprises two rings $7a$ and $7b$ of stainless steel spaced apart by four alumina insulators $8a$, $8b$, $8c$ (shown partly cut away) and $8d$ which also serve to insulate the liner from the aluminium wall $2'$ of the torus. The rings are secured to the insulators by bolts 17 and barrel nuts 18. The lowermost insulator $8a$ rests on a stainless steel rail 9 fastened to the inner surface of the torus. Spaced round the end-face of ring $7b$ are sixteen 56 thou. thick copper plates $10a$ secured to the ring by lugs 11, alumina bushes 12, and bolts 13 (FIG. 5). Sixteen plates $10b$ are similarly secured to the end-face of ring $7a$, the positions of the plates $10b$ being staggered half a plate length from those of the plates $10a$ as shown in FIG. 4. The plates $10a$ and $10b$ support between them thirty-two alumina rods 14 the ends of which are located in recesses in the plates. These rods are appropriately curved to follow the shape of the torus wall, and are prevented from swivelling by plates $10c$ spaced round the inner face of ring $7b$. The plates $10c$, which are similar to plates $10a$ and are mounted opposite them as shown, are each provided with two slots (not shown) parallel to the plane of the rail 9. The rods 14 pass through the slots and are thus restrained from swivelling.

On the rods 14 are stacked the remainder of the plates 15 forming the liner surface. These plates are the same shape as the plates 10 without the lugs, and are each provided with two holes through which pass the rods 14. The plates 15 are separated from one another by 20 thou. thick alumina washers 16. The plates 15 are generally of 39 thou. thick copper, but thinner plates of 15 thou. copper are used to make up each stack of plates to the correct thickness. Most of the plates are omitted from FIG. 4 for clarity.

FIG. 4 shows how adjacent sections are bolted together to form the complete liner. Ring $7a$ of the section shown is bolted to ring $7b$ of the adjacent section by four bolts 19, the rings being separated by spacers 20. It will be seen that the aforementioned staggering of plates $10a$ and $10b$ enables these plates on adjacent rings to be brought close together without the heads of their fastening bolts 13 touching one another, but as a precaution the outward-facing surfaces of these plates are coated with vitreous enamel as shown at 21 in FIGS. 3 and 5 (one plate only is coated in FIG. 3 for clarity) so that their mutual insulation is preserved even if they touch.

Radial holes 22 are provided in the rings $7a$ and $7b$ to facilitate evacuation of the interior of the liner, the vacuum pumps (not shown) being connected to the annular space between liner and torus.

Figure 6:
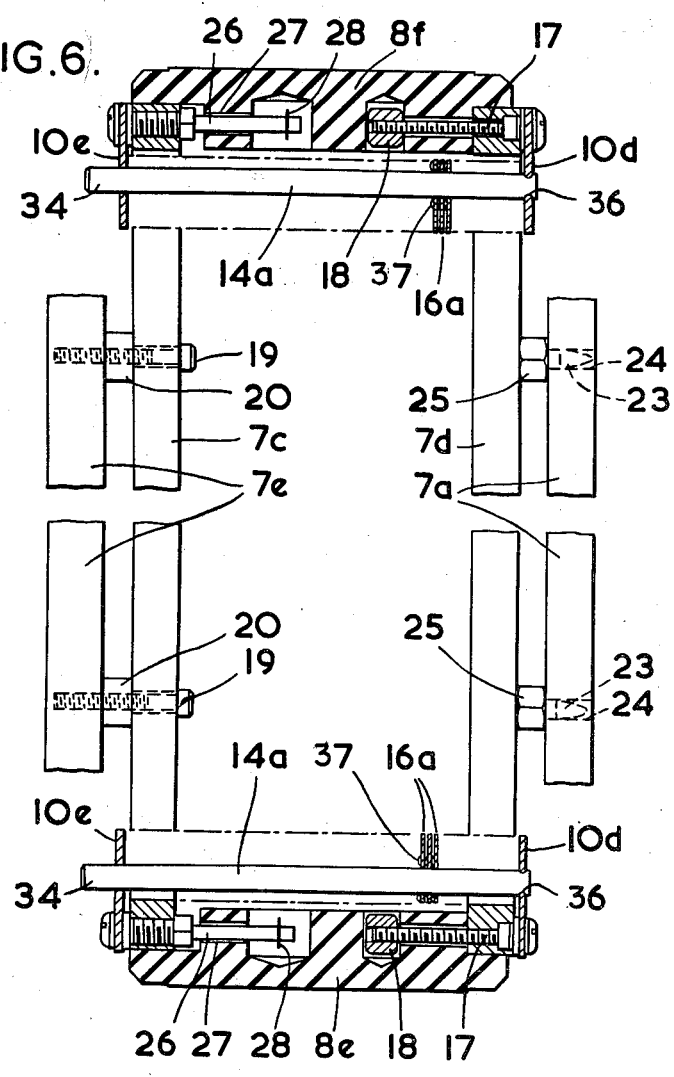
FIG. 6 is a cross-section of one straight liner section adjacent an insulating gap in the torus.

The liner is assembled into two halves by progressively bolting the sections together and sliding them into the two separated half-tori along the rail 9. FIG. 6 shows one of the four straight sections which are located on each side of the two insulating gaps when the two half-tori are brought together. These straight sections are basically similar to the section described with reference to FIGS. 3–5, but provision is made in them for taking up tolerances in the axial dimensions of the liner and torus. Ring $7c$ is bolted to ring $7e$ of the adjacent straight section (which section is bolted in turn to an adjacent curved section not shown), but ring $7d$ is provided with four pins 23 which engage holes 24 in the ring $7a$ of the facing curved section of the other half-liner, the rings being spaced apart by nuts 25 when they meet. Thus the plane of separation of the two half-liners is displaced by the width of one straight section from the plane of separation of the two half-tori. Ring $7d$ is bolted to insulators $8e$ and $8f$ as before by bolts 19 and barrel nuts 18 (the other two insulators are not shown), but ring $7c$ is free to move axially with respect to the insulators, being secured thereto by pins 26 which are a sliding fit in holes 27, and circlips 28. Similarly ring $7e$ can move axially in the adjacent straight section.

The plates $10d$ bolted to the face of ring $7d$ are similar to the plates $10a$, but the rods $14a$ are secured to the plates $10d$ by a circumferential groove 36 at one end of each rod which engages a slot in each plate. The other end of each rod passes through clearance holes in the plates $10e$ bolted to the face of ring $7c$. The lugless plates $16a$ which are stacked on the rods $14a$ are separated from one another by stainless steel crinkle washers 37, and to preserve the insulation between the plates the latter are all coated on both faces with vitreous enamel. When the rings $7d$ and $7a$ are brought together, the crinkle washers flatten and reduce the distance between rings $7c$ and $7d$ sufficiently to allow the two half-tori to meet. The projecting ends 34 of the rods $14a$ pass into clearance holes (not shown) in the stacks of plates fastened to the ring $7e$ of the adjacent straight section, and similarly the projecting ends of the rods $14a$ of the adjacent straight section pass into clearance holes in the plates $10e$ and $16a$.

Since the plates are about 5 cms. long, the effective area of each plate 15 exposed to the discharge is about 1 sq. cm.

Figure 7:
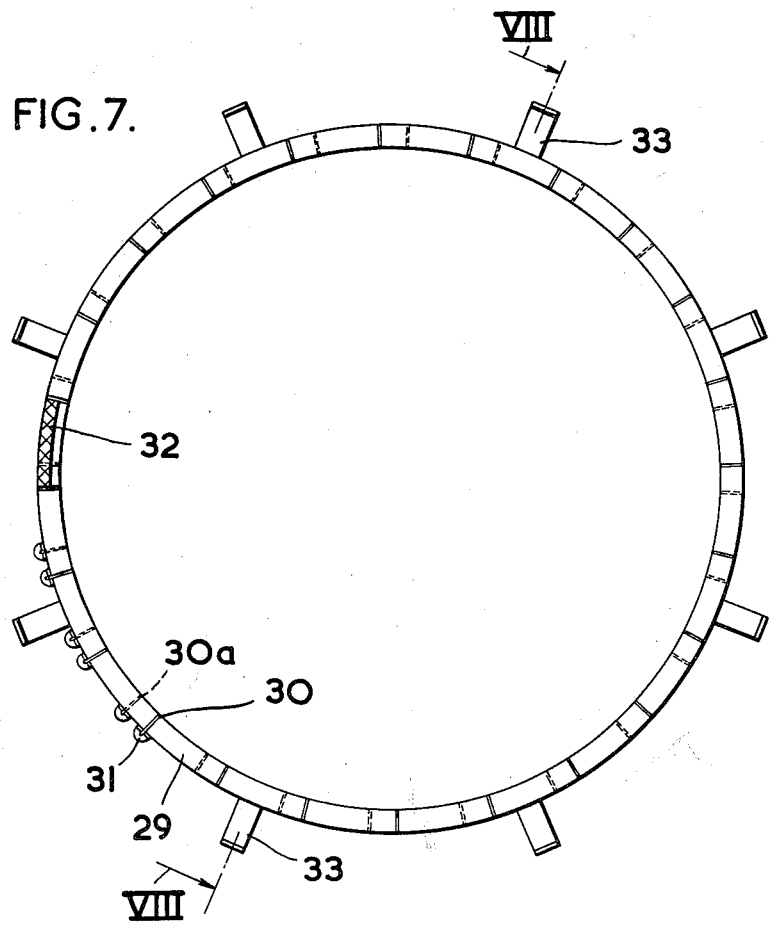
FIG. 7 is an end view of a curved section of another form of liner.

FIG. 8 shows a curved section of another form of liner embodying the invention. This section is built up of a plurality of plate-like rings 29 as shown, FIG. 7 having radial slots 30 each bridged by an external lug 31 (only three lugs 31 are actually shown on ring 29 in the drawing). The rings 29 are vitreous enamelled on both surfaces to within a suitable distance, e.g. ⅛ inch, of their inner peripheries (as shown at 32 between two slots only for clarity), and to a thickness equal to approximately half the desired spacing between the liner plates. To form a liner section a large number of the rings 29 are bonded together with a second vitreous enamel having a lower melting point than the first-mentioned enamel, it being arranged that the slots 30 in adjacent rings 29 are staggered as shown at $30a$. After bonding, the lugs 31 are broken off so that the arcuate portions of the rings 29 between the slots form mutually insulated plates.

In order to mount the liner section, two of the rings 29 are each provided with eight mounting lugs 33 which are secured to rings similar to the rings 7 shown in FIGS. 3–6 by means of bolts and insulating bushes.

For straight liner sections the rings 29 are made of sheet metal of uniform thickness, but for curved sections sheet metal having a tapered cross-section is used as shown in FIG. 8.

By ensuring that the slots 30 are filled with vitreous enamel, and bonding the sections end to end, the above-described arrangement can be modified to make the liner itself gas-tight as hereinbefore mentioned.

We claim:

1. In a gas discharge apparatus for producing a high temperature plasma having an inner metallic wall, the improvement wherein said wall comprises a plurality of closely-spaced, thin metallic plates disposed substantially edge-on to the plasma, the edge dimensions and spacing of the plates being such that the effective area of each plate exposed to the plasma is less than that required to maintain a unipolar arc under the predicted operating conditions, and means for mounting the plates in insulated relationship to one another.

2. The improvement as claimed in claim 1 wherein said structure is substantially circular in cross-section.

3. The improvement as claimed in claim 2 wherein said plates are arranged in planes substantially normal to the axis of the structure.

4. The improvement as claimed in claim 3 wherein a plurality of said plates is arranged around the cross-sectional circumference of the structure.

5. The improvement as claimed in claim 4 wherein said plates consist of arcuate portions of a plurality of radially-slotted plate-like metallic rings bonded together by means including an insulant over an area extending part-way from the outer edge of each ring towards the inner edge.

6. The improvement as claimed in claim 5 wherein the rings are spaced apart by the insulant.

7. The improvement as claimed in claim 6 wherein the axis of the structure is curved and some at least of the metallic rings are of tapered cross-section.

8. The improvement as claimed in claim 5 wherein the portions of said plates nearest the plasma are bent such that the insulation between adjacent plates is not directly exposed to the plasma.

9. A method of producing a structure as claimed in claim 5, comprising the steps of forming said rings with the radial slots bridged by external lugs, bonding the rings together with the slots of adjacent rings staggered relative to one another, and removing the lugs.

10. A method of producing a structure as claimed in claim 6 comprising the steps of coating the rings with a first insulant to a thickness of approximately half the required spacing between the plates, and bonding the rings together with a second insulant having a lower melting point than the first insulant.

11. In a gas discharge apparatus for producing a high temperature plasma having an inner metallic wall, the improvement wherein said wall comprises a plurality of closely-spaced thin metallic plates disposed substantially edge-on to the plasma, and means for mounting the plates in insulated relationship to one another.

12. In a gas discharge apparatus for producing a high temperature plasma comprising a metal torus having a wall and at least one insulating gap around the circumference of the bore of the torus, means for establishing a gaseous ring discharge within the torus and a toroidal metallic liner located between the discharge and the wall of the torus, the improvement wherein the liner comprises a plurality of closely-spaced, thin metallic plates arranged substantially edge-on to the discharge, and means for mounting the plates in insulated relationship to one another.

13. In a gas discharge apparatus for producing a high temperature plasma comprising a metal torus having a wall and at least one insulating gap around the circumference of the bore of the torus, means for establishing a gaseous ring discharge within the torus and a toroidal metallic liner located between the discharge and the wall of the torus, the improvement wherein the liner comprises a plurality of closely-spaced, thin metallic plates arranged substantially edge-on to the discharge, the edge dimensions and spacing of the plates being such that the effective area of each plate exposed to the discharge is less than that required to maintain a unipolar arc under the predicted operating conditions, and means for mounting the plates in insulated relationship to one another.

References Cited in the file of this patent

Proceedings of the Second United Nations International Conference on the Peaceful Uses of Atomic Energy, vol. 32, United Nations, Geneva (1958), pages 40–80.